| United States Patent [19] | [11] 3,716,257 |
|---|---|
| Hackman et al. | [45] Feb. 13, 1973 |

[54] PUSH-IN FITTING FOR PLASTIC PIPE

[75] Inventors: Frank C. Hackman; Robert R. Roos, both of Decatur, Ill.

[73] Assignee: Mueller Co., Decatur, Ill.

[22] Filed: March 15, 1971

[21] Appl. No.: 124,056

[52] U.S. Cl..................................285/210, 285/379
[51] Int. Cl..............................................F16l 5/02
[58] Field of Search......285/162, 196, 201, 205, 206, 285/207, 208, 209, 210, 379

[56] References Cited

UNITED STATES PATENTS

| 2,744,559 | 5/1956 | Leonetti | 285/208 X |
| 2,478,508 | 8/1949 | Simpson | 285/210 |
| 1,978,958 | 10/1934 | Robinson | 285/208 |
| 2,932,322 | 4/1960 | Mercier | 285/208 X |
| 3,280,298 | 10/1966 | Klancke et al. | 285/208 X |
| 3,401,958 | 9/1968 | Demyon | 285/208 |

FOREIGN PATENTS OR APPLICATIONS

| 734,849 | 8/1955 | Great Britain | 285/196 |

*Primary Examiner*—David J. Williamowsky
*Assistant Examiner*—David H. Corbin
*Attorney*—Cushman, Darby & Cushman

[57] ABSTRACT

A fitting is provided for establishing a fluid connection with a main, the fitting being of the type having a tubular member with a through bore and a collar secured at one end thereof; the collar is formed with diametrically extending ears, the overall dimension of which is greater than the aperture in the main through which the fitting is to be inserted; the exterior of the tubular member is threaded and carries a threaded nut and an annular gasket and centering ring; the radial thickness of the ring is such that it is substantially equal to the difference between the radius of the aperture in the main and the exterior radius of the tubular member so that when the fitting is disposed in the aperture of the main the centering ring will function to dispose the tubular element concentrically with respect to the aperture; the annular gasket is provided with a depending neck portion of a thickness substantially equal to the thickness of the centering ring so as to completely occupy the space between the wall of the aperture and the exterior surface of the tubular fitting.

7 Claims, 4 Drawing Figures

INVENTORS
ROBERT R. ROOS
FRANK C. HACKMAN

BY Cushman, Darby & Cushman
ATTORNEYS

PUSH-IN FITTING FOR PLASTIC PIPE

BACKGROUND OF THE INVENTION

It has generally been the practice in constructing fluid distribution systems to lay out a main which is a conduit of comparatively large cross-sectional area and which carries fluid at a relatively high pressure. At appropriate intervals along the main openings are provided to receive fittings for establishing fluid connections for branch pipes to provide service for individual consumers. Since, generally, as in the case of water distribution systems, the pipes comprising this system are buried in the ground subsequent to the connection of the various branches of the system, it is highly desirable that the seals used between the various connections be made to function reliably over as long a period of time as possible. It is desirable also to provide a fitting which does not project into the main to an extent that will cause interference with the flow of fluid through the main and result in lateral stresses being applied to the fitting.

In situations where a main is laid in a trench and suitable openings bored in the main, the fluid couplings of the prior art have resorted to a variety of anchoring means which have in general permitted the establishment of the fluid connection where access to the interior of the pipe is impractical or impossible. Several couplings of the prior art rely on the provision of a notch formed in the exterior surface of the fitting at a predetermined distance from one end of the coupling at which end radially extending lugs are provided for engagement with the interior wall of the main or pipe. Such arrangements have suffered from the disadvantage that relatively precise and, as a consequence, expensive, manufacturing procedures are required and also from the disadvantage that such couplings can be employed only with pipes having a relatively narrow range of wall thicknesses.

Other types of fluid couplings have used radially extending lugs which can either be inserted through the opening in the main by positioning one lug through the opening and then swinging the other lug through, or which construct the fitting so that the anchoring means are moveable with respect to the fitting. The foregoing arrangements have suffered from the disadvantage that, on the one hand, once the tubular fitting was located in place, it was possible to move the tubular fitting laterally of the opening since the fitting did not closely interengage with the side wall of the opening. On the other hand, it was possible to prevent such movement by sufficiently tightening the anchoring element. But such tightening often resulted in the extrusion of the seal into the space between the opening and the tubular fitting and even into the main which eventually results in destruction of the seal altogether.

In still other types of fittings, deformable metal elements are used to anchor the fitting to the interior wall of a main. In such cases, it is necessary that the tubular fitting project a distance approximetely equal to the width of the deformable element into the main, so that, as a consequence, the flow interference previously noted results. Additionally, such fittings can only be satisfactorily employed with metal pipes since, in the case of plastic pipes, the deformable metal element has a tendency to cut into the plastic material in the process of establishing the fluid coupling.

Coupling arrangements such as those discussed above relating to the field of the present invention are disclosed in the following references:

| | | |
|---|---|---|
| 194,336 | Denniston et al. | Aug. 21, 1877 |
| 377,506 | Whiter | Feb. 7, 1888 |
| 1,049,283 | Westphal | Dec. 31, 1912 |
| 1,355,450 | Carlson | Oct. 12, 1920 |
| 1,472,794 | Foley | Nov. 6, 1923 |
| 2,099,678 | Curtis | Nov. 23, 1937 |
| 2,478,508 | Simpson | Aug. 9, 1949 |

The present invention avoids all the foregoing disadvantages by providing a novel fitting having an improved anchoring assembly as well as a unique sealing arrangement for cooperation therewith and which can be quickly and easily installed.

SUMMARY OF THE INVENTION

The fitting of the present invention consists of a threaded tubular member having a through bore, one end of which in one embodiment is provided with a threaded portion of reduced diameter. A collar element having radially extending ears or lugs is provided for attachment to the end portion of the tubular member. The distance between the extremities of the lugs or ears on the collar element and the exterior diameter of the tubular member are such that the fitting may be inserted through an opening of a specified diameter larger than that of the tubular member by first engaging one lug beneath the edge of the opening with the fitting tilted at an angle with respect to the longitudinal axis of the main and then swinging the other lug through the opening. A centering ring is provided having a radial thickness such that it will occupy the radial space between the exterior diameter of the tubular fitting and the wall of the opening in the main so that when the fitting is inserted into the opening, it can be disposed and maintained concentrically therewith. An annular gasket having a deformable housing and a threaded tightening nut are also mounted about the exterior of the tubular member. The gasket is constructed from a deformable material and provided with a neck portion having a radial thickness substantially equal to that of the centering ring so that when the body portion of the gasket is in engagement with the exterior surface of the main, the sleeve portion will be inserted into the opening between the interior wall of the main and the exterior surface of the tubular member.

With the foregoing arrangement, when the nut is screwed down along the tubular member to compress the gasket, the centering ring will be so disposed as to prevent extrusion of the gasket into the main as the nut is tightened. As a result a superior and durable seal is achieved.

One of the chief objects of the present invention, therefore, is to provide a fitting which can be connected to a main from the exterior thereof where access to the inside of the main is impractical or impossible. Another object is to provide a fitting which can be coupled with a main in such a manner as to minimize interference with the fluid flow through the main. A still further object of the present invention resides in the provision of means for accurately locating the fitting concentrically of the opening in the main, which means will also prevent extrusion of the sealing means of the fitting into the main. Other objects of the present invention include the provision of a fitting having an improved gasket seal having a portion for insertion into the opening and which will be more evenly subjected to pressure loads so as to be able to withstand long use; and the provision of a fitting which can be rapidly and securely coupled with the main by a relatively unskilled worker.

These and other objects and attendant advantages will become apparent as further consideration is given to the following detailed description of the preferred embodiment of the invention together with the accompanying drawings, in which:

DETAILED DESCRIPTION OF THE INVENTION

Figure 1:
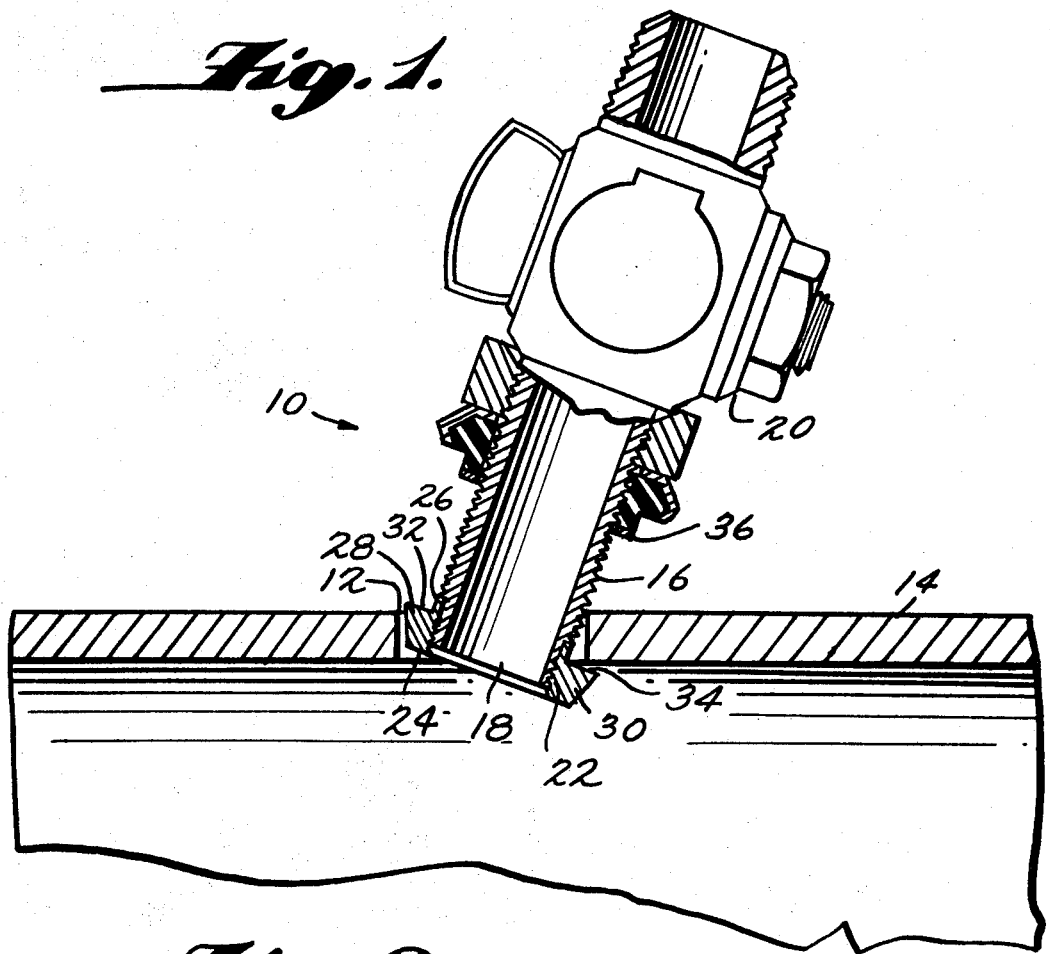
FIG. 1 is a cross-sectional view partly in elevation of the fitting of the present invention taken on a longitudinal axis of the plastic main and illustrating the insertion into the main.

Referring now to the drawings wherein like numerals designate corresponding parts throughout the several views there is illustrated in FIG. 1 generally by the numeral 10 the fitting of the present invention as it is being inserted into an opening 12 formed through the wall of a plastic main 14. The fitting 10 which may be made from a suitable metal or metal alloy such as brass, consists essentially of a tubular member 16 which is threaded on its exterior surface and provided with a through bore 18. As shown in FIG. 1, a corporation stop 20 is formed integrally with one end of the tubular member, but it will be understood that any other suitable fluid control means may be provided as required or even none at all if desired so as to permit the coupling of a variety of valve elements ro the like to the external end of the tubular member 16.

Figure 4:
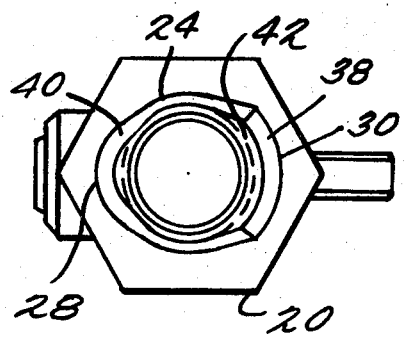
FIG. 4 is an end view of the tubular fitting.

To facilitate the manufacture of the fitting of the present invention, the lower end 22 is provided with a portion of reduced diameter onto which is threaded a collar element 24 having a sleeve portion 26 extending therefrom. The collar 24 may be soldered onto end 22 or the threaded end may be deformed to securely hold the collar in place on the tubular member 16. The sleeve portion 26 has an exterior diameter substantially equal to the exterior diameter of the tubular member 16 for a purpose which will be hereafter more fully described. The collar element 24 is provided with two radially extending ears or lugs 28 and 30, the distance between the extremities of which is larger than the diameter of the opening 12 but small enough to permit insertion of the end of the fitting through the opening by first inserting ear 30 which is formed somewhat wider than ear 28 into the opening first by tilting the fitting at an angle with respect to the surface of the main and then by moving the fitting 10 to a position where its longitudinal axis is perpendicular to the longitudinal axis of the main thereby effecting the insertion of the other ear 28. The ears should be aligned along an axis parallel to the longitudinal axis of the main so as to ensure that the inner surfaces 32 and 34 are brought into as close engagement as possible with the interior surface of the main 14. Surfaces 32 and 34 of the collar element 24 extend in a plane perpendicular to the longitudinal axis of tubular member 16 so as to provide a flat seating surface for the centering ring 36 which encircles the tubular member 16. As more clearly seen in the end view of FIG. 4, the side surfaces 38 and 40 of the collar element 24 taper inwardly towards the outer surface 42 of the collar element 24. Surface 42 is generally planar and extends in a plane parallel to that of the inner surfaces 32 and 34.

Figure 2:
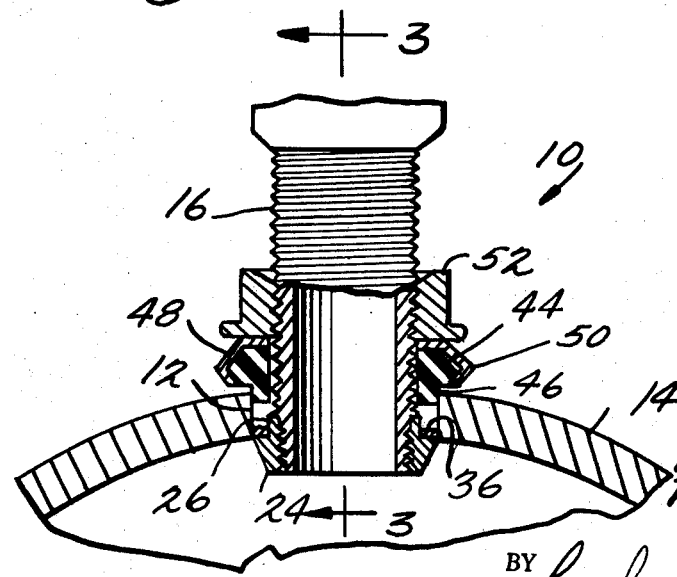
FIG. 2 is a cross-sectional view partly in elevation and taken on a transverse axis of the main and illustrating the fitting after insertion into an opening in the main but prior to the tightening of the nut.
Figure 3:
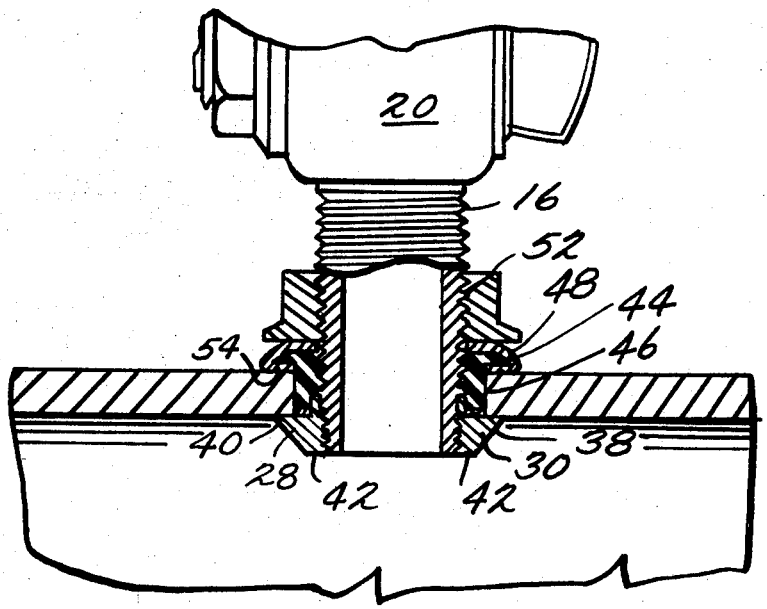
FIG. 3 is a cross-sectional view taken substantially along the lines 3—3 of FIG. 2 but showing the nut tightened.

With reference now to FIGS. 2 and 3, there is illustrated the fitting 10 subsequent to its insertion into the opening 12. In the section view of FIG. 2 looking down the longitudinal axis of the main 14, the centering ring 36 is shown in position between the wall of the opening 12 and the sleeve portion 26 of the collar element 24. The radial thickness of the centering ring is substantially equal to the difference between the radius of the opening 12 and the exterior radius of the sleeve portion 26. In the illustrated embodiment, the axial thickness of the centering ring 36 is substantially less than the thickness of the main 14 so that the depending neck portion 46 of an annular sealing gasket 44 may be fitted into the opening 12 between the interior wall of the opening and the exterior surface of the tubular member 16. As previously noted, the exterior diameter of the sleeve portion 26 is substantially equal to the exterior diameter of the tubular member 16 so as to facilitate moving the centering ring 36 down along the tubular member 16 into the seating position illustrated in FIGS. 2 and 3. An annular sealing gasket 44 constructed from a suitable elastomeric material such as rubber is disposed about the tubular member 16 and is provided with a depending neck portion 46 having a radial thickness such that it will occupy the space between the exterior of the tubular member 16 and the interior wall of the opening 12. The body of the gasket is, of course, large enough to overlap the opening 12. A cupshaped gasket retainer 48 constructed from deformable metal substantially encloses the body of the gasket 44. The gasket retainer 48 is provided with side walls that taper outwardly to point 50 and then inwardly toward the tubular member. The diameter of the lowermost edge of the side wall is greater than the diameter of the opening 12 so that the rim 54 of the retainer 48 will contact the surface of the main at a locus of points spaced from the edge of the opening 12. The side walls of the gasket 44 are shaped to conform to the interior shape of the side walls of the retainer 48. An interiorly threaded nut 52 is carried on tubular member 16 immediately above the gasket retainer 48. As shown in FIG. 3, nut 52 is threaded down toward the end of tubular member 16 to move the gasket 44 into sealing engagement with the exterior of the tubular member 16 and the surface of the main 14. When the rim 54 of the retainer 48 engages the surface of the main 14, and upon continuing tightening of the nut 52, the rim will bend inwardly about point 50 to press the gasket tightly against the tubular member 16. Continued tightening of the nut will force the material of the gasket to flow into the annular space between the wall of the opening 12 and the exterior surface of the tubular member 16 until the space is filled. Centering ring 36, which maintains the tubular fitting in concentric relationship with the opening 12 will prevent extrusion of the gasket material into the main. Additionally, the concentric positioning of the tubular fitting will prevent uneven stresses being exerted on the gasket material due to the pressures exerted by the fluid carried by the main. The centering ring 36 also prevents any movement of the tubular member with respect to the walls of the opening when other fittings or pipes are connected to the other end of the tubular member.

It will be understood that various changes and modifications may be made in the details of construction and arrangement of parts of the present invention without departing from the spirit thereof or the scope of the appended claims.

What is claimed is:

1. A fitting for establishing a fluid-tight connection with a main having a circular opening, said fitting comprising an elongated tubular member having a flow passage therethrough, the exterior surface of said tubular member being threaded and having a threaded nut engaged thereon, said tubular member having a first exterior diameter over at least a major portion of its length and a second exterior diameter that is reduced relative to said first exterior diameter and located at one end portion of said tubular member, said one end portion of said tubular member having an interiorly threaded collar element attached thereto, said collar element having substantially parallel inner and outer surfaces extending generally transverse to the longitudinal axis of said tubular member and defining radially extending generally oppositely disposed ears, the distance between the extremities of said ears being greater than the diameter of said opening, the surfaces of said ears between said inner and outer surfaces of said collar element being rounded and tapered inwardly from said inner surface to said outer surface whereby the insertion of said one end of said tubular member into said opening is permitted by inserting one ear through the opening with the longitudinal axis of said tubular member disposed at an angle with respect to the longitudinal axis of said main and then rotating said tubular member to a position where its longitudinal axis is perpendicular to the longitudinal axis of said main so as to move the other ear through said opening, said tubular member having a deformable annular gasket disposed thereabout between said nut and said collar element and a centering ring disposed between said gasket and said collar element, said gasket and said centering ring being movable longitudinally of said tubular member, said centering ring having substantially parallel opposite sides so that, when said nut presses said gasket against said main, said ring will be in engagement with a portion of said inner surface of said ears and will prevent extrusion of said gasket into said main, the radial thickness of said ring being substantially equal to the difference between the radius of said opening and half of said first exterior diameter of said tubular member, said collar element having an annular neck portion extending from said inner surface thereof, the exterior diameter of said neck portion being substantially equal to said first exterior diameter of said tubular member so that the interior surface of said centering ring will engage the exterior surface of said neck portion whereby, when said ring is disposed in said opening between the wall of said opening and said neck portion of said collar element, said tubular member will be disposed substantially concentrically of said opening.

2. The fitting as claimed in claim 11 wherein said annular gasket is provided with an annular neck portion extending longitudinally of said tubular member on the side of said gasket facing said centering ring and a body portion of dimensions sufficient to overlap said opening in said main, the radial thickness of said neck portion being substantially equal to the said radial thickness of said centering ring when said gasket is in an undeformed state so that said neck portion of said gasket will be inserted into and occupy the radial space between the wall of said opening and the exterior threaded surface of said tubular member when said nut is moved toward said collar to deform said gasket.

3. The fitting as claimed in claim 2 wherein an annular deformable gasket retainer is disposed about said tubular member between said nut and said gasket partially enclosing said gasket, said retainer having a first annular surface portion extending radially outwardly from said tubular member, a second annular surface portion tapering outwardly in the direction of said end of said tubular member and at an angle with respect to said first surface portion and a third annular surface portion tapering inwardly from said second surface portion toward said tubular member to form a housing for said gasket, the enclosed surface portions of said gasket being shaped complementarily to the interior of said housing so that when said nut is moved to seal said gasket, against said main, said third annular surface of said retainer will engage the exterior surface of said main and upon tightening of said nut against said first annular surface, said third surface will be moved inwardly toward said tubular member to press said gasket against said tubular member.

4. The fitting as claimed in claim 1 wherein said collar element is secured to said threaded portion by soldering.

5. The fitting as claimed in claim 1 wherein the initial threads on the interior of said collar element are deformed subsequent to the positioning of said collar element on said one end of said tubular member to securely retain said collar element on said one end of said tubular member.

6. The fitting as claimed in claim 1 wherein the axial thickness of said centering ring is less than the thickness of said opening in said main.

7. The fitting as claimed in claim 6 wherein said annular gasket is provided with an annular neck portion extending longitudinally of said tubular member on the side of said gasket facing said centering ring, the radial thickness of said neck portion being substantially equal to said radial thickness of said centering ring when said gasket is in an undeformed state so that said neck portion of said gasket may be inserted into and occupy the radial space between the wall of said opening and the exterior threaded surface of said tubular member.

* * * * *